(12) United States Patent
Mir et al.

(10) Patent No.: US 6,411,052 B1
(45) Date of Patent: Jun. 25, 2002

(54) METHOD AND APPARATUS TO COMPENSATE FOR RESISTANCE VARIATIONS IN ELECTRIC MOTORS

(75) Inventors: Sayeed A. Mir, Saginaw; Abbas Fardoun, Dearborn; Shaotang Chen, Troy, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/655,582

(22) Filed: Sep. 6, 2000

Related U.S. Application Data
(60) Provisional application No. 60/154,692, filed on Sep. 17, 1999.

(51) Int. Cl.$^7$ .................... H02K 17/32; H02K 23/68
(52) U.S. Cl. ............................ 318/434; 318/798
(58) Field of Search .................. 318/432, 802, 318/805, 800, 798, 434

(56) References Cited

U.S. PATENT DOCUMENTS

| | | | |
|---|---|---|---|
| 3,919,609 A | 11/1975 | Klautschek et al. | 318/227 |
| 4,027,213 A | 5/1977 | de Valroger | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kuhnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,780,658 A * | 10/1988 | Koyama | |
| 4,789,040 A * | 12/1988 | Morishita et al. | |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 5,063,011 A | 11/1991 | Rutz et al. | 264/126 |
| 5,069,972 A | 12/1991 | Versic | 428/407 |
| 5,122,719 A | 6/1992 | Bessenyei et al. | 318/629 |
| 5,223,775 A | 6/1993 | Mongeau | 318/432 |
| 5,444,341 A | 8/1995 | Kneifel, II et al. | 318/432 |
| 5,469,215 A | 11/1995 | Nashiki | 318/432 |
| 5,579,188 A | 11/1996 | Dunfield et al. | 360/99.08 |
| 5,616,999 A | 4/1997 | Matsumura et al. | 318/632 |
| 5,625,239 A | 4/1997 | Persson et al. | 310/68 B |
| 5,672,944 A | 9/1997 | Gokhale et al. | 318/254 |
| 5,777,449 A | 7/1998 | Schlager | 318/459 |
| 5,780,986 A | 7/1998 | Shelton et al. | 318/432 |
| 5,852,355 A | 12/1998 | Turner | 318/701 |
| 5,898,990 A | 5/1999 | Henry | 29/598 |
| 5,920,161 A | 7/1999 | Obara et al. | 318/139 |
| 5,963,706 A | 10/1999 | Baik | 388/804 |
| 5,977,740 A | 11/1999 | McCann | 318/701 |
| 6,013,994 A * | 1/2000 | Endo et al. | |
| 6,104,150 A | 8/2000 | Oohara et al. | 318/254 |
| 6,184,638 B1 * | 2/2001 | Kinpara | |
| 6,281,659 B1 * | 8/2001 | Giuseppe | |

* cited by examiner

*Primary Examiner*—Jeffrey Donels
(74) *Attorney, Agent, or Firm*—Edmund P. Anderson

(57) ABSTRACT

An apparatus and method are described for adjusting the modeled resistance used in the control of an electric motor drive to match the actual resistance of the motor. The system comprises sensors for measuring motor current and motor speed, which data is inputted into a processing unit. The processor uses the measured rotational speed to calculate what the proper current should be based upon the torque desired. If the calculated current is not equal to the measured current, then the modeled resistance of the motor is altered to correct the current. The invention is particularly useful for permanent magnet brushless motors operating in voltage mode.

7 Claims, 1 Drawing Sheet

METHOD AND APPARATUS TO COMPENSATE FOR RESISTANCE VARIATIONS IN ELECTRIC MOTORS

CROSS REFERENCE TO RELATED APPLICATIONS

This application is based upon, and claims the benefit of, U.S. Provisional Patent Application No. 60/154,692, filed on Sep. 17, 1999, the entirety of which is incorporated herein by reference.

FIELD OF THE INVENTION

This invention relates to correcting for the resistance fluctuations in electric motor windings.

BACKGROUND OF THE INVENTION

When electric motors are run in voltage mode, changes in the resistance of the windings result in changes in current for any given voltage. Because torque is directly proportional to current, such resistance fluctuations cause undesirable fluctuations in motor torque. The most common cause of resistance fluctuation in electric motors is heat.

BRIEF SUMMARY OF THE INVENTION

Disclosed is an apparatus and method for adjusting a modeled resistance used in the control of an electric motor drive to match the actual resistance of the motor. The system comprises sensors for measuring motor current and motor speed, which data is inputted into a processing unit. The processor uses the measured rotational speed to calculate what the proper current should be based upon the torque desired. If the calculated current is not equal to the measured current, then the modeled resistance in the controller is altered to correct the current. The invention is particularly useful for permanent magnet brushless motors operating in voltage mode.

DETAILED DESCRIPTION OF THE INVENTION

Figure 1:
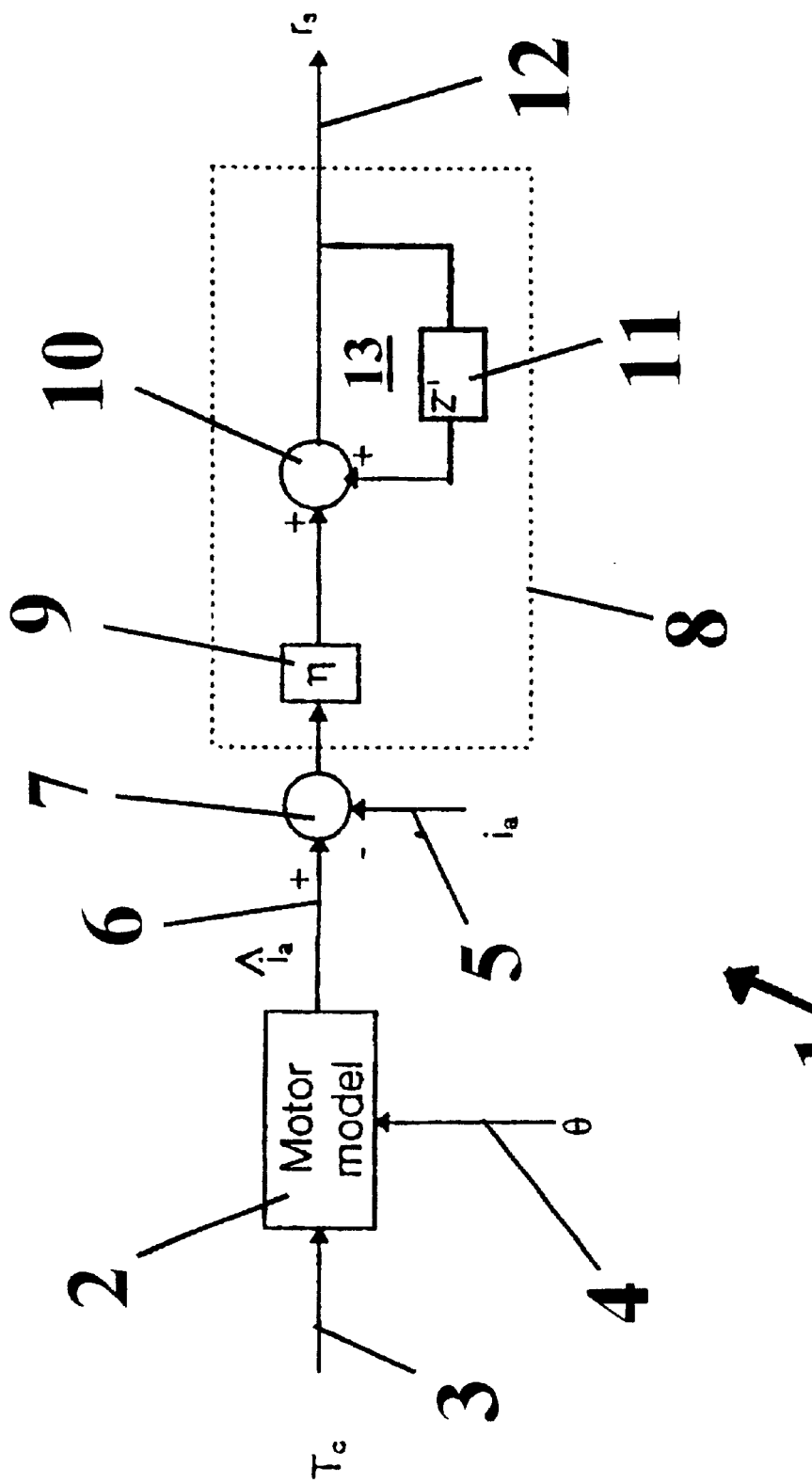
FIG. 1 is a diagram of an embodiment of the invention.

Referring to FIG. 1 there is provided a processing unit 1 having a virtual model 2 of the electric motor (not shown) being controlled. The processing unit is adapted to receive as inputs a command torque input 3, a measured motor rotational speed 4 and a measured motor current 5. Alternatively, the processing unit could receive information on rotor position and use the information to calculate the rotational speed. The motor current can be either the real time phase current, torque component of the motor current or the motor current vector (peak phase current). The command current outputted from model 2 is in the same form as the motor measured current being compared. Note that "command torque" represents the desired torque output of the electric motor, which is proportional to current.

Using the command torque and measured motor speed information and applying it to the virtual model, the processing unit is able to calculate what the correct command current should be. The motor model is simply a mathematical equation that gives motor current as a function of motor torque and speed. The speed of the motor affects the motor current where motor current vector is not controlled to be in phase with the motor back emf voltage. The motor model could be based on purely theoretical formulae, but it is preferred that the model be verified by the actual experimental data taken from the actual motor, or motors identical to it.

The calculated command current is inputted 6 to a comparator unit or algorithm 7 that compares the command current with the measured actual current input 5. The difference, if any, is inputted as data to a regression analysis algorithm or unit 8 that utilizes, preferably, a least-squares algorithm to calculate an adaptation gain factor η (which is a constant gain) that it applied to the input by a gain unit or algorithm 9. The regression unit 8 outputs a signal 12 to the electric motor controller to indicate by what factor the resistance of the phase must be changed.

The regression analysis unit 8 preferably also has a summing point 10 and one sample feedback delay 11. The units 10 and 11 together form a digital integrator 13, which can also be formed by an equivalent analog circuit (not shown). The output 12 represents the compensated resistance (i.e., the measured actual resistance), which is fed to the motor control algorithm (not shown) and any other algorithms that use the modeled motor phase resistance.

The modeled resistance of the phase is the total resistance between the input voltage point and the neutral point of the motor which comprises the motor winding resistance, controller resistance, harness resistance, and connector resistance.

Although it is preferred that the steps of the invention be executed by software in a central processing unit (CPU), all or some of the steps may be hardwired for execution in hardware. Hence, for example, the term "regression analysis unit" is to be construed broadly as either a piece of software code designed to carry out the functions described, or hardware designed to achieve the same purpose.

It is preferred that high frequency ripple on the measured motor current due to the inverter switching be eliminated by using a hysteresis band (not shown) or suitable filtering at the output of the comparator 7.

It will be understood that a person skilled in the art may make modifications to the preferred embodiment shown herein within the scope and intent of the claims. While the present invention has been described as carried out in specific embodiments thereof, it is not intended to be limited thereby, but rather is intended to cover the invention broadly within the scope and spirit of the claims.

What is claimed is:

1. An apparatus for adjusting the modeled resistance of an electric motor by motor current, comprising:
   a sensor for measuring motor current;
   device for measuring motor speed;
   a processing unit adapted to:
      receive said measured motor current, said measured motor speed and a command torque;
      calculate a command motor phase current based upon said command torque and measured motor speed;
      compare said calculated command phase current with said measured motor current to derive a current error; and
      adjust the modeled resistance from the said current error to adjust said measured motor current to equal said calculated command phase current.

2. The invention of claim 1, further comprising:
   an integration unit adapted to integrate said current error.

3. The invention of claim 2 wherein said integration unit comprises a tunable integration gain to estimate said motor resistance.

4. The invention of claim 1 further comprising a regression unit adapted to execute said adjustment of the modeled resistance.

5. The invention of claim 4 wherein said regression unit is adapted to calculate a gain factor and multiply it by said current error and output the result as a signal indicative of by what factor the modeled resistance is to be changed.

6. The invention of claim 5 wherein said regression unit further comprises a digital integrator.

7. The invention of claim 6 wherein said digital integrator comprises a summing point and a sample feedback delay.

* * * * *